March 10, 1925.
R. A. HOWE ET AL
FRUIT JAR TOOL
Filed May 16, 1924
1,529,311
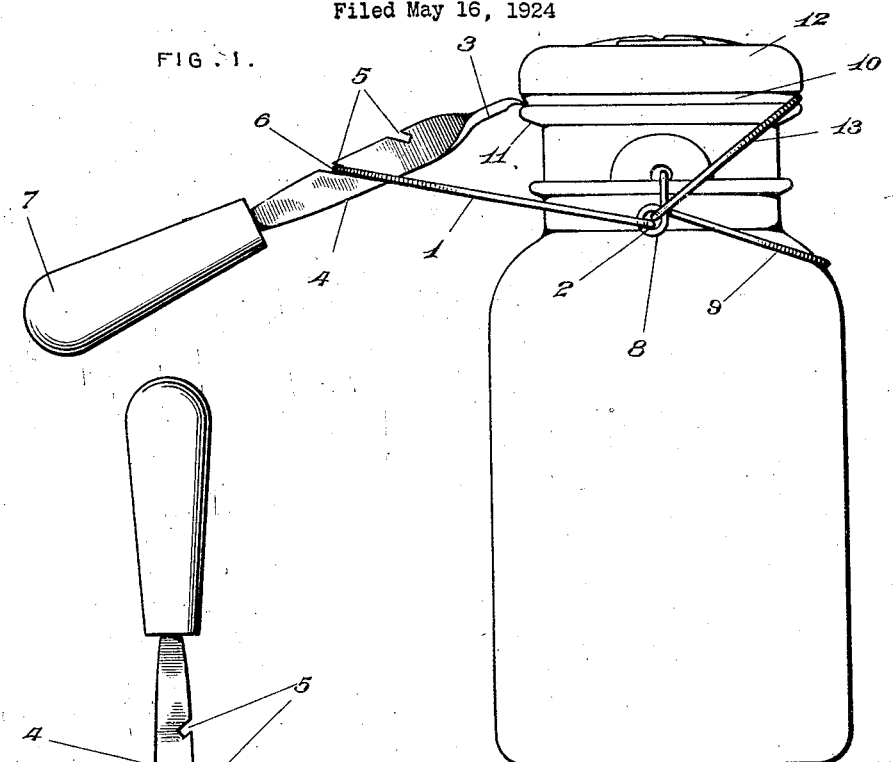
FIG. 1.
FIG. 2.
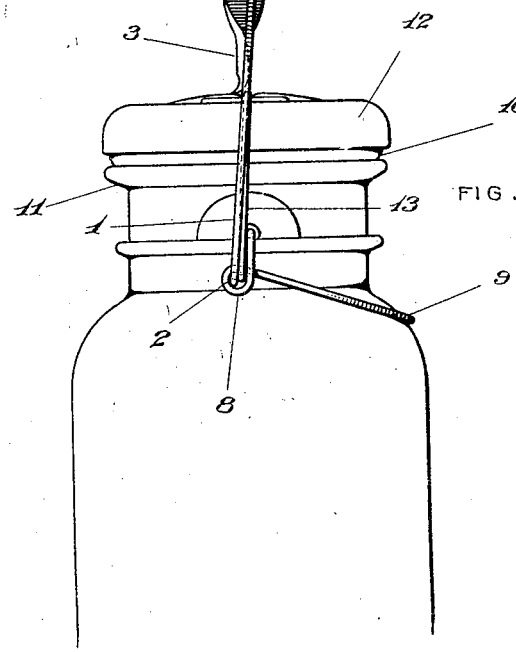
Roy A. Howe
John F. Irish
Inventors
By Ogle R. Singleton
Attorney Patented Mar. 10, 1925.

1,529,311

UNITED STATES PATENT OFFICE.

ROY A. HOWE AND JOHN F. IRISH, OF BANTAM, CONNECTICUT.

FRUIT-JAR TOOL.

Application filed May 16, 1924. Serial No. 713,828.

*To all whom it may concern:*

Be it known that we, ROY A. HOWE and JOHN F. IRISH, citizens of the United States, residing at Bantam, in the county of Litchfield, in the State of Connecticut, have invented certain new and useful Improvements in Fruit-Jar Tools, of which the following is a specification.

Our invention consists in a new and useful improvement in fruit-jar tools and is designed to provide a tool which serves both for a jar opener and a jar carrier. Our device is intended for use in connection with that type of glass fruit jars which is hermetically sealed by means of a glass top resting upon a rubber gasket and clamped in air-tight contact therewith by means of a wire bail held in clamping position by a locking lever.

Figure 1 of the drawing is a side elevation showing our device in use as a jar opener, and Fig. 2 of the drawing is a side elevation showing our device in use as a jar carrier.

Our tool comprises an elastic bail 1, with hooked ends 2, and a wedge 3 having in its shank 4 notches 5 for engagement with the bight 6 of the bail 1, and a handle 7. To use the device as a jar opener, the hooked ends 2 of the bail 1 are engaged in the loops 8 of the locking lever 9, the bight 6 of the bail 1 is engaged in one of the notches 5 in the wedge shank 4 and the wedge 3 is inserted between the rubber gasket 10 and the bezel 11 on top of the jar. When the handle 7 of the wedge 3 is raised, the wedge 3 is forced inwardly and forces the gasket 10 and glass top 12 from the neck of the jar. During the opening operation, the clamping bail 13 is engaged with the bezel 11 on the side of the jar opposite to the place in which the wedge 3 is inserted.

To use our tool as a jar carrier, the hooked ends 2 of the bail 1 are engaged in the loops 8 of the locking lever 9, the bail 1 arching the top of the jar. The bight 6 of the bail 1 is engaged in one of the notches 5 of the wedge 3 which rests against the top 12 of the jar.

Having described our invention, what we claim is:

In a fruit-jar tool, the combination with an elastic bail provided with hooked ends for engagement with the loops of the locking lever of a fruit jar, and a bight of sufficient length to be spaced somewhat above the top of the jar when the hooks are so engaged, of a wedge having a shank and a handle, slanting notches being provided in the sides of the shank inclined to the longitudinal axis of the handle.

In testimony whereof we affix our signatures.

ROY A. HOWE.
JOHN F. IRISH.